US010487791B1

United States Patent
Hao et al.

(10) Patent No.: US 10,487,791 B1
(45) Date of Patent: Nov. 26, 2019

(54) TEMPERATURE CONTROL STRATEGY FOR ELECTRIC STARTER SYSTEM WITH POLYPHASE BRUSHLESS STARTER MOTOR

(71) Applicant: GM Global Technology Operations LLC, Detroit, MI (US)

(72) Inventors: Lei Hao, Troy, MI (US); Suresh Gopalakrishnan, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 15/967,910

(22) Filed: May 1, 2018

(51) Int. Cl.
  *F02N 11/00* (2006.01)
  *F02N 11/10* (2006.01)
  (Continued)

(52) U.S. Cl.
  CPC ........ *F02N 11/106* (2013.01); *F02N 11/0851* (2013.01); *H02P 21/16* (2016.02); *F02N 2011/0896* (2013.01); *F02N 2200/045* (2013.01); *F02N 2300/104* (2013.01); *F02N 2300/106* (2013.01); *F16F 15/30* (2013.01)

(58) Field of Classification Search
  CPC ............... F02N 11/106; F02N 11/0851; F02N 2011/0896; F02N 2200/045; F02N 2300/105; F02N 2300/106
  See application file for complete search history.

(56) References Cited

U.S. PATENT DOCUMENTS

| 4,856,286 A | * | 8/1989 | Sulfstede | ................ F25B 13/00 62/89 |
| 6,054,826 A | * | 4/2000 | Murakami | ................ B60L 3/04 318/434 |

(Continued)

FOREIGN PATENT DOCUMENTS

| CN | 2711983 Y | 7/2005 |
| EP | 0619427 B1 | 10/1994 |
| JP | 2000104650 A | 4/2000 |

OTHER PUBLICATIONS

Quanbao Zhou, John Houldcroft, "Cold engine cranking torque requirement analysis," SAE International Inc., 2007, JSAE 20077002.
(Continued)

*Primary Examiner* — Thomas N Moulis
(74) *Attorney, Agent, or Firm* — Quinn IP Law

(57) ABSTRACT

An electric starter system is usable with a powertrain having an engine with a flywheel. The starter system includes a brushless starter motor having a machine temperature, and a solenoid operable for translating a pinion gear into meshed engagement with the flywheel and the starter motor in response to a requested engine start event. A controller has temperature regulation logic that includes a proportional-integral torque control loop. Execution of a method embodied by the logic, in response to the requested engine start event when the machine temperature exceeds a first temperature, causes the controller to determine a required starting torque of the starter motor using the control loop. The controller causes the starter motor to transmit the required starting torque to the engine at a level that reduces the machine temperature below the first temperature.

20 Claims, 3 Drawing Sheets

(51) Int. Cl.
*F02N 11/08* (2006.01)
*H02P 21/16* (2016.01)
*F16F 15/30* (2006.01)

(56) References Cited

U.S. PATENT DOCUMENTS

| | | | | |
|---|---|---|---|---|
| 6,055,141 | A * | 4/2000 | Dorschky | H02H 7/0852 318/471 |
| 6,386,171 | B1 * | 5/2002 | Koerner | F01M 3/02 123/196 R |
| 2008/0258472 | A1 * | 10/2008 | Mottier | F02N 11/101 290/38 D |
| 2010/0154524 | A1 * | 6/2010 | Salman | F02N 11/0859 73/114.59 |
| 2011/0042969 | A1 * | 2/2011 | Fuller | F02N 11/087 290/38 R |
| 2012/0173129 | A1 * | 7/2012 | Wanner | F02N 11/0862 701/113 |
| 2012/0275078 | A1 * | 11/2012 | Kokubun | F02N 11/087 361/160 |
| 2014/0353979 | A1 * | 12/2014 | Magini | F02N 11/08 290/38 C |
| 2015/0361941 | A1 * | 12/2015 | Du | F02N 11/108 702/33 |
| 2016/0114801 | A1 * | 4/2016 | Park | B60W 30/18 701/22 |
| 2016/0245559 | A1 * | 8/2016 | Yang | F25B 31/006 |
| 2017/0037784 | A1 * | 2/2017 | Chevalier | F02N 11/08 |
| 2018/0306157 | A1 * | 10/2018 | Lee | B60W 20/50 |

OTHER PUBLICATIONS

Hao et al, Utility U.S. Appl. No. 15/961,128, filed Apr. 24, 2018.
Hao et al, Utility U.S. Appl. No. 15/961,094, filed Apr. 23, 2018.
Namuduri et al, Utility U.S. Appl. No. 15/967,918, filed May 1, 2018.
Namuduri et al, Utility U.S. Appl. No. 15/967,915, filed May 1, 2018.

* cited by examiner

TEMPERATURE CONTROL STRATEGY FOR ELECTRIC STARTER SYSTEM WITH POLYPHASE BRUSHLESS STARTER MOTOR

INTRODUCTION

Powertrains, power plants, and other systems may include an internal combustion engine that generates engine torque in response to an acceleration request. The generated engine torque is transmitted to a coupled load via a power transmission arrangement, e.g., one or more planetary gear sets. In some powertrain configurations, an electric machine referred to as a starter motor may be used to support a cranking and starting function of the engine, such as when automatically restarting the engine after a fuel-conserving engine auto-stop event. A rotor of the starter motor may be connected to an engine crankshaft, such as via a meshed gear engagement with a flywheel. Motor torque from the starter motor is thereafter used to accelerate the engine to a threshold starting speed. The starter motor is then disconnected from the engine once the engine has started and is able to sustain a threshold idle speed.

SUMMARY

An electric starter system is disclosed herein. The electric starter system, which is configured for use with a powertrain or other system having an internal combustion engine, includes a solenoid, a translatable pinion gear, and a polyphase brushless starter motor having a rotor and a ring gear. The brushless starter motor is selectively connectable to a flywheel of the engine via operation of the solenoid in response to a requested engine start event. Translation of the pinion gear by action of the solenoid places the pinion gear in meshed engagement with the ring gear and the flywheel. In this manner, motor torque from the starter motor is delivered to the flywheel via rotation of the interposed pinion gear.

The electric starter system also includes an electronic controller. One or more temperature sensors may be optionally connected to the brushless starter motor, such as to a pair of phase windings and/or a lamination slot or other physical structure of the brushless starter motor. The temperature sensors output electronic signals indicative of a temperature level of the brushless starter motor, with the temperature referred to herein as the machine temperature. Alternatively, a state observer residing within the controller or in a separate control device may be used to estimate the machine temperature in real time.

The controller is configured to regulate temperature of the starter motor by automatically limiting the starter motor's output power, and thus its motor torque, based on machine temperature. To do this, the controller is programmed with proportional-integral (PI) control logic forming a torque control loop. Heat within the starter motor tends to increase when the starter motor operates at a combination of low speed and high torque. The low-speed/high-torque operating mode is typically present during an automatic restart event of the engine. Thus, the controller uses a temperature-profiled methodology to regulate the machine temperature during such a low-speed/high-torque operating mode.

Execution of temperature regulation logic in response to the requested engine start event ultimately causes the controller to determine a required starting torque of the starter motor, and to transmit a torque command to the starter motor to cause the starter motor to transmit the required starting torque to the engine. The required starting torque has a value that, via operational of the programmed logic, automatically limits output power of the starter motor based on the machine temperature, thereby maintaining the machine temperature within a permissible range.

Within the disclosed PI control loop, integral gain is affected by machine temperature, and therefore the integral gain in the control loop is automatically modified as machine temperature changes. The integral gain may be, in various embodiments, a $1^{st}$ order function of machine temperature or determined by accessing a lookup table populated or referenced by machine temperature. Rotor flux within the starter motor is likewise closely related to machine temperature, and therefore is also considered as a control parameter within the control loop. As with the integral gain, rotor flux may be determined mathematically or via a lookup table. Additionally, as terminal voltage of the starter motor varies with changing machine temperature, such a value may also be used by the controller in the overall control of the starter motor.

In a possible embodiment, an electric starter system includes a brushless starter motor having a machine temperature, a solenoid operable for translating a pinion gear into meshed engagement with a flywheel of an engine to thereby connect the brushless starter motor to the flywheel in response to a requested engine start event, and a controller. The controller is programmed with temperature regulation logic having a PI torque control loop.

Execution of the temperature regulation logic by the controller in response to the requested engine start event, when the machine temperature is greater than a first temperature, causes the controller to determine a required starting torque of the brushless starter motor, via the PI torque control loop, at a level that reduces the machine temperature below the first temperature. The controller also commands the solenoid to translate the pinion gear into the meshed engagement with the flywheel, and to command delivery of the required starting torque by the brushless starter motor to the engine.

The controller may abort the requested engine start event via the PI torque control loop when the machine temperature is greater than a second temperature that exceeds the first temperature.

The brushless starter motor may be electrically connected to a power inverter module (PIM). In such an embodiment, the controller may be configured to generate or command pulse width modulation of the PIM to provide the required starting torque at the level that reduces the machine temperature below the first temperature.

The electric starter system may include at least one temperature sensor positioned on or within the brushless starter motor and configured to measure the machine temperature. Alternatively, the controller may include a state observer operable for estimating the machine temperature in real time.

The controller, via the PI torque control loop, may use a q-axis current command, a d-axis current command, a q-axis feedback current value, and a d-axis feedback current value as inputs, apply an integral gain indexed or referenced by the machine temperature, and generate a q-axis voltage command and a d-axis voltage command to the starter motor as outputs.

The PI torque control loop may also include a flux linkage block that calculates a back electromotive force (back-EMF) of the brushless starter motor as a product of an angular speed and a flux leakage value of the starter motor, with the flux leakage value being based on the machine temperature.

The controller is configured in such an embodiment to calculate the q-axis voltage command using the back-EMF.

A powertrain is also disclosed herein. An embodiment of the powertrain includes an internal combustion engine having a flywheel, a transmission coupled to the engine, a load coupled to the transmission, and the electric starter system.

A method is also disclosed for regulating temperature of an electric starter system having a brushless starter motor. The method may include detecting, via a controller, a requested engine start event of an internal combustion engine in which a solenoid translates a pinion gear into meshed engagement with the brushless starter motor and the engine. The method may also include determining a machine temperature of the brushless starter motor using the controller. In response to the requested engine start event when the machine temperature is greater than the first temperature, the method may further include determining a required starting torque of the starter motor using a PI torque control loop of the controller. The required starting torque is a value that limits an output power level of the starter motor to a level sufficient for reducing the machine temperature below a first temperature. The controller then transmits a torque command to the starter motor to cause the starter motor to transmit the required starting torque to the flywheel of the engine via the pinion gear.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
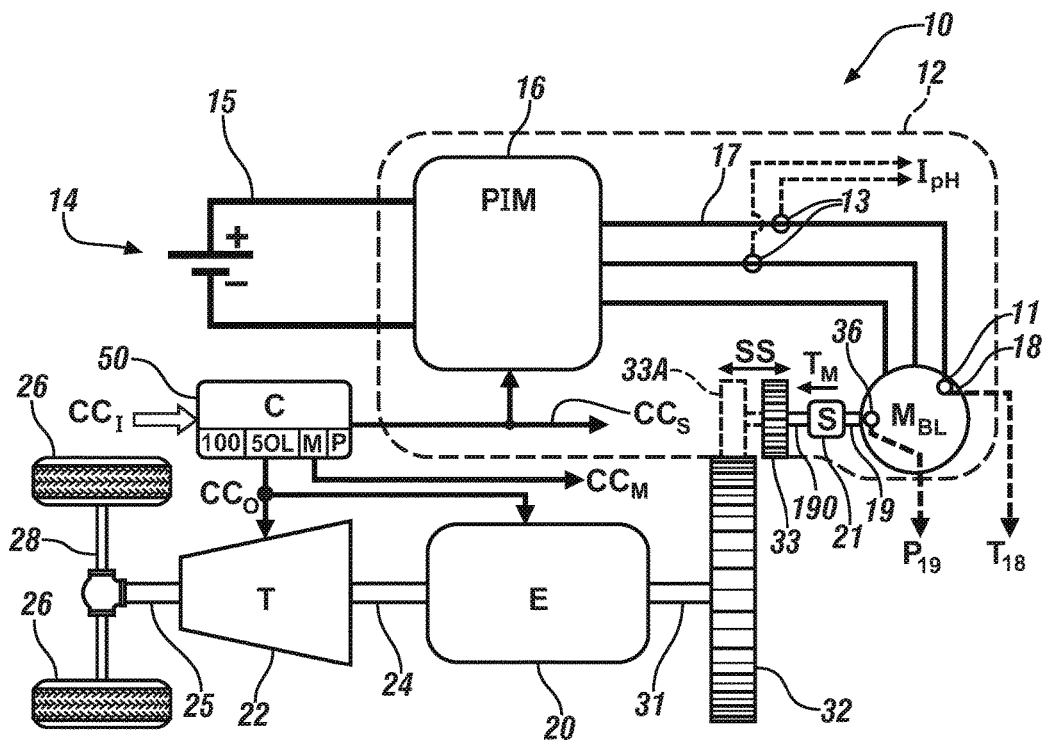
FIG. 1 is a schematic illustration of an example powertrain having a polyphase brushless starter motor whose machine temperature is used in a proportional-integral (PI) torque control/feedback loop during an engine auto-start event as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features may be exaggerated or minimized to show details of particular components. Therefore, specific structural and functional details disclosed herein are not to be interpreted as limiting, but rather as a representative basis for teaching one skilled in the art to variously employ the present disclosure. As those of ordinary skill in the art will also understand, features illustrated and described with reference to a given one of the figures may be combinable with features illustrated in one or more other figures in order to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

Referring to the drawings, wherein like reference numbers refer to the same or like components in the several Figures, a powertrain 10 is shown schematically in FIG. 1. The powertrain 10 includes an electric starter system 12 that is selectively connectable to an internal combustion engine (E) 20. The electric starter system 12 includes and/or is controlled via a controller (C) 50. The controller 50 is configured to execute a temperature regulation method 100 in the overall control of a torque operation of a polyphase/alternating current (AC) brushless electric machine, hereinafter referred to as brushless starter motor (MBL) 18. Thus, torque feedback control of the starter motor 18 is automatically performed by the controller 50 in order to regulate the temperature of the brushless starter motor 18 in the manner set forth below.

The brushless starter motor 18 may be variously configured as a surface permanent magnet machine, an internal permanent magnet machine, a drag-cup induction machine, a switched reluctance machine, or another type of brushless motor without limitation. As recognized herein, brushless motors such as the starter motor 18 may enjoy an extended operating life with an improved level of speed control precision relative to certain brush-type motors, among other possible benefits.

The engine 20, which may be embodied as a gasoline or diesel engine, ultimately outputs engine torque to an output shaft 24. The output shaft 24 may be coupled to a transmission (T) 22, such as via a hydrodynamic torque converter or clutch (not shown). The transmission 22 may be embodied as one or more planetary gear sets, a gear box, or a continuously-variable arrangement, ultimately delivers output torque at a suitable gear or speed ratio to a transmission output member 25. The output member 25 in turn drives a coupled load via one or more drive axles 28, with the load depicted in FIG. 1 as a set of drive wheels 26 in an example automotive application. Other beneficial applications for the powertrain 10 may be envisioned, including power plants, robotics, mobile platforms, and non-motor vehicle applications such as watercraft, marine vessels, rail vehicles, and aircraft, and therefore the motor vehicle embodiment of FIG. 1 is intended to be illustrative of the disclosed concepts without limitation.

The engine 20 of FIG. 1 also includes a crankshaft 31 that is mechanically coupled to a flywheel 32. When the engine 20 is not running, such as after a fuel-conserving auto-stop event of the engine 20 or when cruising with the engine 20 turned off, the electric starter system 12 may be electrically energized in response to starter control signals (arrow $CC_S$)

from the controller 50 so as to selectively command delivery of motor torque (arrow $T_M$) to the engine 20 via the flywheel 32.

A solenoid (S) 21 may be included as part of the electric starter system 12 for this purpose. The solenoid 21 according to an exemplary embodiment is disposed between a rotor 19 of the brushless starter motor 18 and a shaft extension 190, possibly with a gear reduction set (not shown) located between the rotor 19 and the solenoid 21. Alternatively, a fixed ring gear (not shown) may be coupled to the rotor 19, with the solenoid 21 translating a pinion gear 33 into and out of engagement with the flywheel 32 and such a ring gear. A position sensor 36, e.g., a Hall-effect sensor, multiplying rotary encoder, inductive sensor, or reluctance sensor, may be used to measure and output an angular position (arrow $P_{19}$) of the rotor 19, which the controller 50 may use to determine an angular position and rotational speed of the rotor 19.

In a possible embodiment, when the solenoid 21 is energized in response to the starter control signals (arrow $CC_S$), the solenoid 21 linearly translates the pinion gear 33 to the position indicated at 33A, and thus into direct meshed engagement with mating teeth or splines on the flywheel 32 and/or a gear element connected thereto. Once the engine 20 has started and runs at a speed sufficient to sustain its fueling and internal combustion process, the starter control signals (arrow $CC_S$) are discontinued. As a result of this action, the solenoid 21 is de-energized. The pinion gear 33 is then urged out of engagement with the flywheel 32 via return action of the solenoid 21. Such bi-directional translation capability of the pinion gear 33 is represented in FIG. 1 by double-headed arrow SS.

The example electric starter system 12 of FIG. 1 may include or may be connected to a direct current (DC) battery pack 14, e.g., a multi-cell lithium ion, nickel metal hydride, or lead acid battery pack having positive (+) and negative (−) terminals. The electric starter system 12 may include a power inverter module (PIM) 16 that is electrically connected across the positive (+) and negative (−) terminals of the battery pack 14 via the DC voltage bus 15, e.g., a 12-48 VDC bus in a possible embodiment, as well as to a polyphase/alternating current (AC) voltage bus 17. Although omitted from FIG. 1 for illustrative simplicity, the PIM 16 includes semiconductor switching pairs, e.g., MOSFETs, which are connected to positive (+) and negative (−) terminals via the DC voltage bus 15, and signal filtering circuit components which ultimately convert DC power from the battery pack 14 into polyphase power on the AC voltage bus 17.

In turn, the AC voltage bus 17 is electrically connected to individual phase windings internal to the brushless starter motor 18. Phase current sensors 13 may be positioned on two or more phase windings or leads of the brushless starter motor 18 as shown, with measured phase currents (arrow $I_{PH}$) transmitted to the controller 50. The starter motor 18 may be configured such that a calibrated back electromotive force results for a given performance range, e.g., 3-5V at 6000 RPM, or other values ensuring that sufficient motor torque (arrow $T_M$) is available for starting the engine 20, e.g., 5-7 Nm within parameters of the DC voltage bus 15.

In accordance with the present disclosure, the controller 50 of FIG. 1 is configured to regulate machine temperature of the brushless starter motor 18 within a permissible temperature range during and after conducting an automatic start event of the engine 20. To this end, at least one temperature sensor 11 may be positioned within the starter motor 18 and configured to measure and transmit a temperature signal (arrow $T_{18}$) indicative of the machine temperature. The temperature sensor 11, for instance a thermocouple or a thermistor, may be positioned at an end-turn of a given phase winding (not shown) of the starter motor 18. Another temperature sensor 11 may be positioned within a lamination slot (not shown) of the starter motor 18. Alternatively, the temperature sensors 11 may be omitted in favor of a real-time estimated temperature, e.g., via a state observer of the controller 50. However the machine temperature is ultimately determined, the machine temperature is used as part of a set of input signals (arrow CO to the controller 50.

Figure 3:
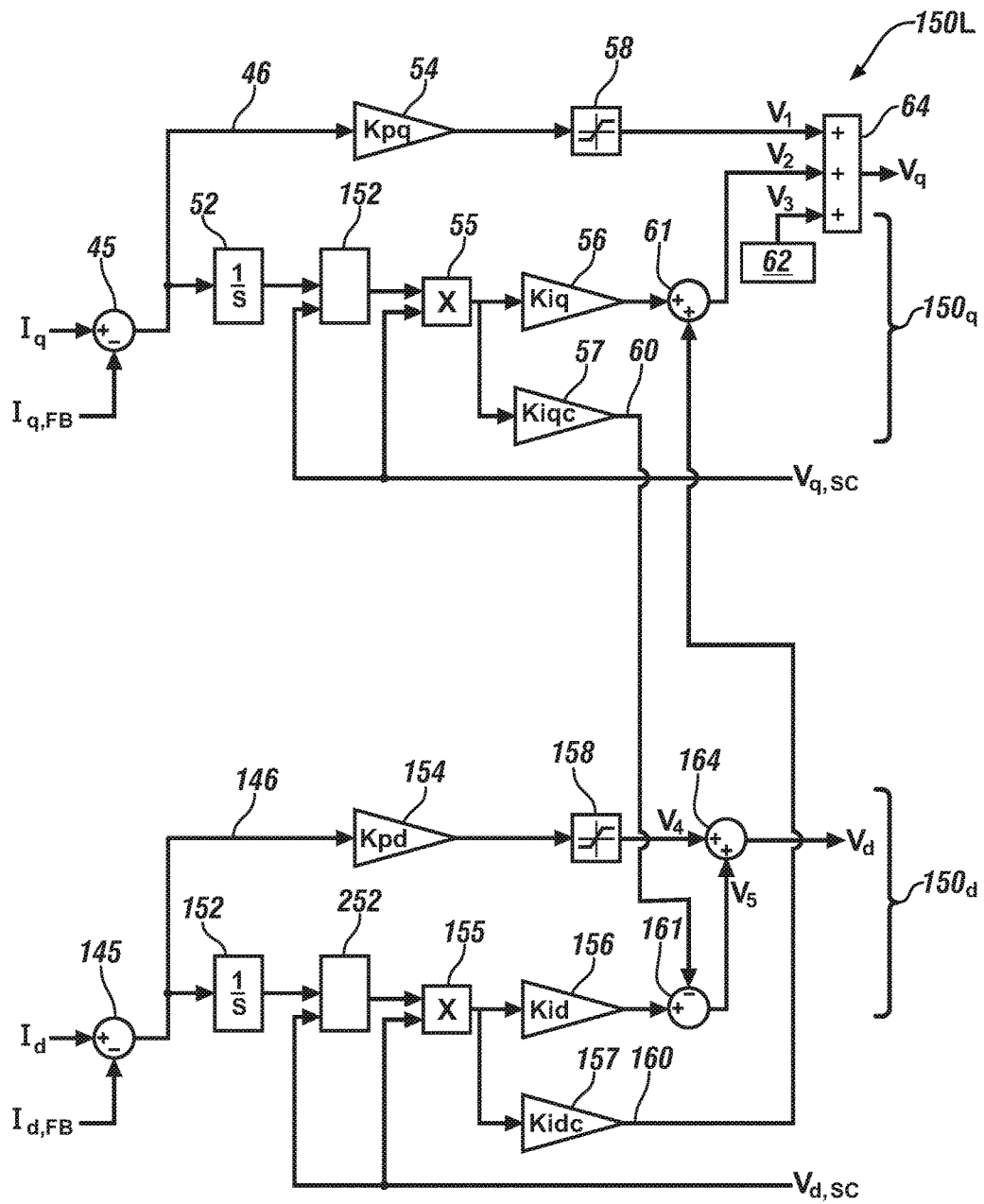
FIG. 3 is a schematic logic flow diagram describing an exemplary implementation of temperature regulation logic usable with the electric starter system of FIG. 1.

The controller 50 may be variously implemented as one or more control devices collectively managing the motor torque (arrow $T_M$) from the brushless starter motor 18 within the example electric starter system 12, with the controller 50 performing this task using temperature regulation logic 150L according to a method 100, an example of which is shown as 150L in FIG. 3. Multiple controllers may be in communication via a serial bus, e.g., a Controller Area Network (CAN), or via discrete conductors. The controller 50 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. The controller 50 may also store algorithms and/or computer executable instructions in memory (M), including the underlying algorithms or code embodying the method 100 described below, and transmit commands to the electric starter system 12 to enable performance of certain control actions according to the present disclosure.

The controller 50 is in communication with the engine 20 and also receives, as part of the input signals (arrow $CC_1$), signals indicative of a speed and temperature of the engine 20, as well as other possible engine operating conditions or parameters. Such parameters include a starting request of the engine 20, whether operator-initiated or autonomously generated. The controller 50 is also in communication with the brushless starter motor 18, and thus receives signals indicative of current speed, current draw, torque, temperature, and/or other operating parameters. The controller 50 may also communicate with the battery pack 14 and receive signals indicative of a battery state of charge, temperature, and current draw, as well as a voltage across the respective DC and AC voltage buses 15 and 17. In addition to transmitting a torque request to the starter motor 18 via the starter control signals (arrow $CC_S$), the controller 50 also transmits output signals (arrow $CC_O$) to the engine 20 and transmission 22 and motor control signals (arrow $CC_M$) to the starter motor 18 as part of the overall operating function of the controller 50.

Figure 2:
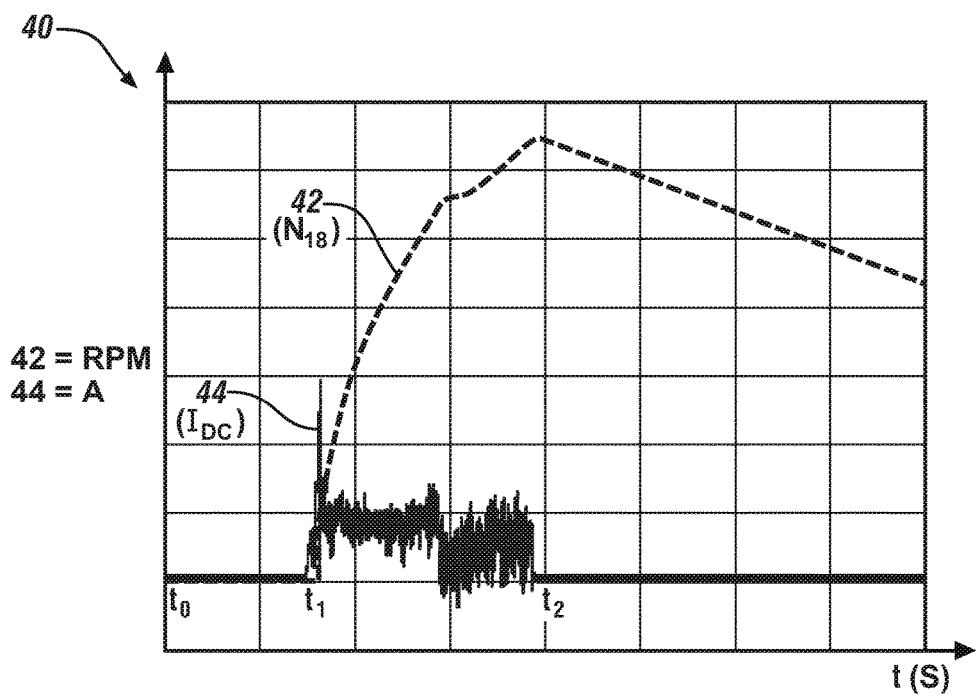
FIG. 2 is a plot of electrical current and rotational speed performance values of the starter motor shown in FIG. 1, with electrical current and rotational speed depicted on the vertical axis and time depicted on the horizontal axis.

Referring to FIG. 2, a representative time plot 40 is shown for rotational speed $N_{18}$ of the brushless starter motor 18, i.e., trace 42, and for machine current $I_{DC}$, i.e., trace 44. Speed in RPM and current in amps (A) are depicted on the vertical axis, with time in seconds, i.e., t(s), depicted on the horizontal axis. The brushless starter motor 18 of FIG. 1 is located in proximity to the engine 20, and thus temperature around the brushless starter motor 18 is subject to substantial variation under normal operating conditions. Depending on the severity, such temperature variation, absent the present method 100, may result in inconsistent performance of the brushless starter motor 18 and/or difficulty starting the engine 20.

Additionally, heat tends to be generated early in a starting sequence when the brushless starter motor 18 is operating at low speeds and high torque levels, e.g., 0-7000 RPM. That is, from $t_0$ to $t_1$ in FIG. 2, the starter motor 18 is at zero speed, such that no current flows through the starter motor 18 and no heat is generated. Cranking of the engine 20 commences at $t_1$ with a rapid increase in current feed to the phase windings of the brushless starter motor 18 of FIG. 1, as indicated by the rapidly rising trajectory of trace 42 and the peak current of trace 44, with a large amount of heat generated. Cranking of the engine 20 of FIG. 1 continues between $t_1$ and $t_2$ until the engine 20 starts. The starter motor 18 is then turned off at $t_2$, with the rotational speed $N_{18}$ (trace 42) thereafter decaying as the starter motor 18 is turned off and the solenoid 21 disengages the pinion gear 33 of FIG. 1.

The controller 50 is programmed to consider and compensate for undesirable temperature effects due to rising machine temperature within or around the brushless starter motor 18 of FIG. 1. Phase windings of the starter motor 18 are typically constructed of copper, which is an element having a temperature coefficient of 0.393 percent (%) per degree Celsius (° C.). Thus, the internal resistance of conductive portions of the starter motor 18 varies by 0.393% for every 1° C. change in the machine temperature. Since the machine temperature can easily vary anywhere between −40° C. and 180° C. during normal operation of the electric starter system 12 of FIG. 1, the controller 50 uses the logic 150L detailed in FIG. 3 to compensate in real time for such temperature changes.

As shown in FIG. 3, the temperature regulation logic 150L may have, as different inputs, a commanded quadrature axis/q-axis current ($I_q$) and a direct axis/d-axis current ($I_d$) needed to achieve a required torque and rotational speed of the brushless starter motor 18, feedback currents ($I_{q,FB}$) and ($I_{d,FB}$), and integrator scales ($V_{q,SC}$) and ($V_{d,SC}$). As understood in art of synchronous electric machines, in a rotating d-q frame of reference the d-axis coincides with an axis of the rotor 19. The q-axis is perpendicular to the d-axis. The controller 50 is thus configured to transmit a d-axis and q-axis current command to the starter motor 18 in order to control a torque operation of the starter motor 18.

The feedback currents ($I_{q,FB}$) and ($I_{d,FB}$) may be calculated by the controller 50 in real time. For instance, two phase currents, such as for phases A and B, are measured via the current sensors 13 shown in FIG. 1 and transmitted to the controller 50. The controller 50 then transforms the measured phase currents into the corresponding feedback current ($I_{q,FB}$) or ($I_{d,FB}$). For instance, the controller 50 may perform a stationary-to-synchronous frame transformation, i.e., a Cartesian "ABC" frame to a rotating machine "dq" frame transformation.

The integrator scales ($V_{q,SC}$) and ($V_{d,SC}$) are values that may also be calculated by the controller 50 of FIG. 1. For instance, with a maximum d-axis control voltage being a predicted value, or a preset value such as between 0.9 to 0.97 of a peak phase voltage, then the maximum q-axis control voltage may be calculated by the controller 50, i.e.:

$$V_q = \sqrt{V_S^2 - V_d^2}$$

where $V_q$ is the maximum q-axis control voltage, $V_d$ is the maximum d-axis control voltage, and $V_S$ is the peak phase voltage. If the maximum d-axis control voltage ($V_d$) exceeds the peak phase voltage, i.e., if $V_d > V_S$, then the derivative scale $$V_{d,sc} = \frac{V_S}{V_d}.$$

However, when the maximum q-axis control voltage $V_q$ exceeds the peak phase voltage $V_S$, then the integrator scale $$V_{q,sc} = \frac{V_S}{V_d}.$$

Otherwise, the integrator scale $V_{q,sc}$ is equal to 1. Both the output voltage limitation and integrator scale ($V_{q,sc}$) use the peak phase voltage ($V_S$). However, peak phase voltage ($V_S$) varies with machine temperature. For a low-voltage starter motor 18 such as a 12V starter motor, the phase voltage drop due to cable and battery, e.g., a 1V difference between a cold and hot engine 20, has a significant impact. The controller 50 therefore employs the following compensation to minimize the temperature effect:

$$V_S = V_B - I_{PH}(R_C + R_B)$$

where $V_B$ is the voltage of battery pack 14, $I_{PH}$ is the phase current on the AC voltage bus 17, $R_C$ is the resistance of a length of cable connecting the battery pack 14 to the PIM 16, and $R_B$ is the internal resistance of the battery pack 14, with $R_C$ and $R_B$ both being temperature dependent values.

As shown in FIG. 3, the illustrated logic 150L may include a q-axis control loop 150q and a d-axis control loop 150d, with the control loops 150q and 150d being cross-coupled as set forth below. In the q-axis control loop 150q, a q-axis feedback current ($I_{q,FB}$) is subtracted from a q-axis current command ($I_q$) at node 45 to generate an adjusted q-axis current command 46. The adjusted q-axis current command 46 is then fed into a temperature-independent proportional gain block (Kpq) 54 and an integrator block (1/S) 52. The output of proportional gain block 54 is fed into a saturation block 58, which in turn applies calibrated upper and lower limits to the output of the proportional gain block 54. This limited voltage value ($V_1$) is fed into another summation block 64.

The output of the integrator block 52 is fed, along with the integrator scale ($V_{q,SC}$) noted above, into a limiter block 152. Like the saturation block 58 described above, the limiter block 152 in the integral loop of the depicted q-axis control loop 150q applies upper and lower limits to the output of the integrator block 52. The output of integrator block 52, along with the integrator scale ($V_{q,SC}$), are multiplied together at multiplier block 55, with this result processed through separate integral gain blocks 56 and 57. The integrator gain block 57 is a cross-coupled gain block that is independent of machine temperature, while the integrator block 56 is a temperature-dependent gain value, with both values possibly extracted from a lookup table in memory (M) of the controller 50 or calculated by the controller 50 using the processor (P) of FIG. 1.

The output (trace 60) of temperature-independent integrator gain block 57 is fed into node 161 as a cross-couple term into the d-axis control loop 150d. At the same time, the output of integrator gain block 56 is added to another cross-coupled term that is output (trace 160) from the d-axis control loop 150d as explained below. The sum at node 61 is fed into the summation node 164 as another voltage value $V_2$ and added to the limited output of saturation block 58, i.e., the voltage value $V_1$ noted above.

An additional input to the summation block 64 is a temperature-dependent terminal voltage value calculated by the controller 50 to properly compensate for temperature effects on magnetic flux density of the starter motor 18. Magnetic flux density varies by about 30% over a typical operating temperature range of the starter motor 18. For instance, at −40° C. the flux density may be about 1.29, decreasing to 1 at about 180° C. Since flux linkage is directly related to magnetic flux density, the controller 50 is configured to compensate directly for such temperature-based changes in the flux linkage, doing so at flux linkage block 62.

That is, by using flux linkage block 62, the controller 50 multiples the product of the angular speed of the rotor 19 of brushless starter motor 18 (see FIG. 1), i.e., $N_{18}$ of FIG. 1, and k, i.e., a flux leakage constant extracted from a lookup table based on machine temperature, or calculated in real time based on changes in machine temperature. Thus, the flux linkage block 62 determines the product of angular speed and flux linkage to generate, as a third voltage value $V_3$, the back-electromotive force (back-EMF) of the starter motor 18.

The final output voltage of summation block 64, i.e., $V_1+V_2+V_3$, may be used by the controller 50 as the synchronous q-axis control voltage (Vq). The controller 50 may control internal switching operation of the PIM 16 of FIG. 1 in order to apply the synchronous q-axis control voltage ($V_q$) to the brushless starter motor 18, as will be appreciated by one of ordinary skill in the art.

FIG. 3 also depicts implementation for the d-axis. That is, the feedback current ($I_{d,FB}$) is subtracted from the d-axis current command ($I_q$) at node 145 to generate an adjusted d-axis current command 146. The adjusted d-axis current command 146 is fed into a temperature-independent proportion gain block (Kpd) 154 and an integrator block (1/S) 152. The output of the proportional gain block 154 is then fed into a saturation block 158, which applies calibrated upper and lower limits to the output of the proportional gain block 154. This limited voltage value ($V_4$) is fed into a summation block 164.

The output of the integrator block 152 is fed, along with the derivative scale ($V_{d,SC}$) noted above, into a limiter block 252, which applies upper and lower limits to the output of the integrator block 152. The output of integrator block 152, along with the derivative scale ($V_{d,SC}$), are multiplied together at multiplier block (X) 155, with this result processed through separate integral gain blocks 156 and 157. Gain block (Kidc) 157 is, like block 57 in the q-axis control loop 150$q$, a cross-coupled gain block that is independent of machine temperature. Block 156 applies a temperature-dependent gain value, with the gains of blocks 156 and 157 possibly being extracted from a lookup table stored in memory (M) of the controller 50 or calculated by the controller 50. The output (trace 160) of integrator gain block 157 is then fed into node 61 of the q-axis control loop 150$q$. At the same time, the output (trace 60) of block 57 within the q-axis control loop 150$q$ is subtracted from the output of block 156 within the d-axis control loop 150$d$ at node 161. The difference at node 161 is fed into summation node 164 as another voltage value $V_5$, and added at summation node 164 to the limited output of saturation block 158, i.e., the voltage value $V_4$.

The final output voltage of summation block 164 within the d-axis control loop 150$d$, i.e., $V_4+V_5$, is thereafter used by the controller 50 as the synchronous d-axis control voltage ($V_d$). The controller 50 may control internal switching operation of the PIM 16 of FIG. 1 in order to apply the synchronous d-axis control voltage ($V_d$) to the brushless starter motor 18, as will be appreciated by one of ordinary skill in the art.

Figure 4:
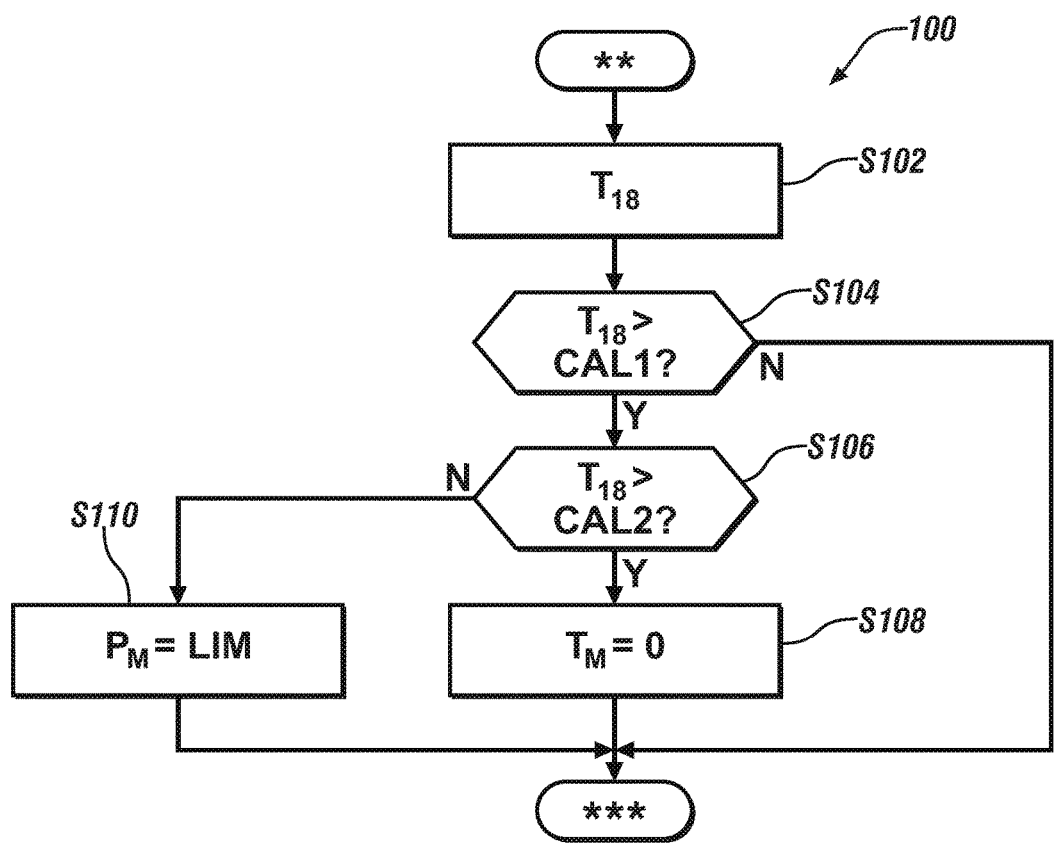
FIG. 4 is a flow chart describing an example embodiment of a method for regulating machine temperature of the starter motor shown in FIG. 1, particularly during an engine start event.

FIG. 4 is a flow chart describing a possible embodiment of the method 100 for regulating machine temperature of the brushless starter motor 18 shown in FIG. 1. Normally, the starter motor 18 will include stator windings and a permanent magnet or a conductive bar within the rotor 19. The permitted operating temperature of the starter motor 18 is largely determined by the material properties of such hardware components. Therefore, the controller 50 shown in FIG. 1 is configured to automatically limit the machine temperature via active torque control of the starter motor 18 so as to protect the hardware components of the starter motor 18 from undesirable temperature effects, particularly when operating under low-speed/high-torque operating conditions.

Beginning at step S102 of FIG. 4, upon initialization () of the controller 50 of FIG. 1, the controller 50 determines the machine temperature, e.g., via direct measurement using the temperature sensors 11 to output the temperature signal ($T_{18}$), or via estimation using a state observer. The method 100 proceeds to step S104** when the machine temperature has been determined.

Step S104 includes comparing the machine temperature determined at step S102 to a first temperature, i.e., a first calibrated threshold (CAL 1). The first temperature may be a maximum operating temperature short of a higher shut-down temperature limit, as detailed in step S106, e.g., at an upper end of a normal permissible operating temperature range. The method 100 proceeds to step S106 when the machine temperature exceeds the first temperature. The method 100 is otherwise finished *** when the machine temperature is less than the first temperature.

At step S106, the controller 50 next compares the temperature signal ($T_{18}$) or an estimated variant thereof, indicative of the machine temperature, to a second temperature, i.e., a second calibrated threshold (CAL2), corresponding to a maximum permissible machine temperature. The second temperature may correspond to a maximum temperature above which the performance and/or structural integrity of the starter motor 18 is likely to be compromised. The method 100 proceeds to step S108 when the machine temperature from step S102 exceeds the second temperature. The method 100 otherwise proceeds to step S110.

At step S108, the controller 50 enforces a condition in which the motor torque ($T_M$) that is commanded from the brushless starter motor 18 is set to zero. Effectively, execution of step S108 aborts or prevents further execution of an auto-start event of the engine 20 in order to protect the hardware of the electric starter system 12 of FIG. 1. Coupled with this control action, the controller 50 may record a diagnostic code in its memory (M) indicative of the aborted auto-start event, and may take other actions such as alerting an operator of the powertrain 10 of FIG. 1 with a text message and/or indicator signal. The method 100 is then finished (***).

Step S110 includes commanding a level of machine power ($P_M$) from the starter motor 18 of FIG. 1 at a limited level, i.e., $P_M$=LIM. Step S110 may include applying a multiplier to a normal power level of the brushless starter motor 18, with the multiplier possibly being extracted by the controller 50 from a lookup table indexed or reference by machine temperature, or by a delta temperature relative to a starting temperature.

Using the method 100 described above in conjunction with the electric starter system 12 of FIG. 1, PI control as descried above may be implemented by a control loop in which particular attention is paid to temperature effects on the brushless starter motor 18 of FIG. 1. An integral gain applied within the context of FIG. 3 is temperature-dependent, with temperature effects on rotor flux and machine resistance also considered. Ultimately, the controller 50 selectively limits output power of the starter motor 18 during an auto-start event of the engine 20, using the above-described factors, so as to protect the constituent hardware of the electric starter system 12.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed:

1. An electric starter system for use with an internal combustion engine having a flywheel, the electric starter system comprising:
    a brushless starter motor having a machine temperature;
    a pinion gear;
    a solenoid operable for translating the pinion gear into meshed engagement with the flywheel to thereby connect the brushless starter motor to the flywheel in response to a requested engine start event; and
    a controller programmed with temperature regulation logic having a proportional-integral (PI) torque control loop;
    wherein execution of the temperature regulation logic by the controller in response to the requested engine start event when the machine temperature is greater than a first temperature, causes the controller to determine a required starting torque of the brushless starter motor, via the PI torque control loop, at a level that reduces the machine temperature below the first temperature, to command the solenoid to translate the pinion gear into the meshed engagement with the flywheel, and to command delivery of the required starting torque by the brushless starter motor to the engine.

2. The electric starter system of claim 1, wherein the controller is configured to abort the requested engine start event via the PI torque control loop when the machine temperature is greater than a second temperature that exceeds the first temperature.

3. The electric starter system of claim 1, wherein the brushless starter motor is electrically connected to a power inverter module (PIM), and wherein the controller is further configured to generate or command pulse width modulation of the PIM to provide the required starting torque at the level that reduces the machine temperature below the first temperature.

4. The electric starter system of claim 1, further comprising at least one temperature sensor positioned on or within the brushless starter motor and configured to measure the machine temperature.

5. The electric starter system of claim 1, where in the controller includes a state observer operable for estimating the machine temperature in real time.

6. The electric starter system of claim 1, wherein the PI torque control loop uses a q-axis current command, a d-axis current command, a q-axis feedback current value, and a d-axis feedback current as inputs, applies an integral gain indexed or referenced by the machine temperature, and generates a q-axis voltage command and a d-axis voltage command to the starter motor as outputs.

7. The electric starter system of claim 6, wherein the PI torque control loop also includes a flux linkage block that calculates a back electromotive force of the starter motor as a product of an angular speed and a flux leakage value of the starter motor, the flux leakage value being based on the machine temperature, and wherein the controller is configured to calculate the q-axis voltage command using the back electromotive force.

8. A powertrain comprising:
    an internal combustion engine having a flywheel;
    a transmission coupled to the engine;
    a load coupled to the transmission; and
    an electric starter system that includes:
        a brushless starter motor having a machine temperature;
        a pinion gear;
        a solenoid operable for translating the pinion gear into engagement with the flywheel and the brushless starter motor in response to a requested engine start event;
        a pair of current sensors operable for measuring a corresponding pair of phase currents into the brushless starter motor; and
        a controller in communication with the pair of current sensors and programmed with temperature regulation logic, the temperature regulation logic including a proportional-integral (PI) torque control loop;
        wherein execution of the temperature regulation logic in response to the requested engine start event, when the machine temperature is greater than a first temperature, causes the controller to determine a required starting torque of the starter motor using the PI torque control loop, and further causes the controller to transmit a torque command to the starter motor to cause the starter motor to transmit the required starting torque to the engine at an adjusted level that reduces the machine temperature below the first temperature.

9. The powertrain of claim 8, wherein the load is a set of drive wheels.

10. The powertrain of claim 8, wherein the controller is configured to abort the requested engine start event via the temperature regulation logic when the machine temperature is greater than a second temperature that is higher than the first temperature.

11. The powertrain of claim 8, wherein the brushless starter motor is electrically connected to a power inverter module (PIM), and wherein the controller is further configured to generate or command pulse width modulation of the PIM to reduce the machine temperature below the first temperature.

12. The powertrain of claim 8, further comprising at least one temperature sensor positioned on or within the starter motor and configured to measure the machine temperature.

13. The powertrain of claim 8, where in the controller includes a state observer operable for estimating the machine temperature in real time.

14. The powertrain of claim 8, wherein the PI torque control loop uses a q-axis current command, a d-axis current command, a q-axis feedback current value, and a d-axis feedback current value as inputs, applies an integral gain indexed or referenced by the machine temperature, and generates a q-axis voltage command and a d-axis voltage command to the starter motor as outputs.

15. The powertrain of claim 8, wherein the PI torque control loop also includes a flux linkage block that calculates a back electromotive force of the starter motor as a product of an angular speed and a flux leakage value of the starter motor, the flux leakage value being based on the machine temperature, and wherein the controller is configured to calculate the q-axis voltage command using the back electromotive force.

16. A method for regulating temperature of an electric starter system having a brushless starter motor, the method comprising:

detecting, via a controller, a requested engine start event of an internal combustion engine in which a solenoid translates a pinion gear into meshed engagement with the brushless starter motor and a flywheel of the engine;

determining a machine temperature of the brushless starter motor using the controller;

in response to the requested engine start event when the machine temperature is greater than a first temperature, determining a required starting torque of the starter motor using a proportional-integral torque control loop of the controller, the required starting torque being a value that limits an output power level of the starter motor to a level sufficient for reducing the machine temperature below the first temperature; and transmitting a torque command to the starter motor to cause the starter motor to transmit the required starting torque to the flywheel of the engine via the pinion gear.

17. The method of claim 16, further comprising: aborting the requested engine start event via the controller when the machine temperature is greater than a second temperature that is higher than the first temperature.

18. The method of claim 16, further comprising determining, via the controller, a q-axis current command, a d-axis current command, a q-axis feedback current value, and a d-axis feedback current value as control inputs to the proportional-integral torque control loop, applying an integral gain indexed or referenced by the machine temperature, and generating a q-axis voltage command and a d-axis voltage command to the starter motor via the controller as control outputs.

19. The method of claim 18, further comprising:

using a flux linkage block of the PI control loop to calculate a back electromotive force of the starter motor as a product of an angular speed and a flux leakage value of the starter motor, the flux leakage value being based on the machine temperature; and calculating the q-axis voltage command using the back electromotive force.

20. The method of claim 16, including at least one temperature sensor connected to or within the starter motor, wherein determining a machine temperature of the brushless starter motor includes directly measuring the machine temperature via the at least one temperature sensor.

\* \* \* \* \*